Patented Oct. 16, 1934

1,976,946

UNITED STATES PATENT OFFICE 1,976,946

ACOUSTIC TILE

Max H. Kliefoth, Madison, Wis., assignor to C. F. Burgess Laboratories, Inc., Madison, Wis., a corporation of Delaware No Drawing. Application January 20, 1933, Serial No. 652,696

14 Claims. (Cl. 106—23)

This invention relates to acoustic tiles in which the body particles are bonded together by means of an adhesive.

It is the object of this invention to provide an acoustic tile of ceramic material, especially granular material, which is of a resilient character.

Acoustic tiles may be made by cementing body particles together at their points of contact or by shrinking the cementitious binder so as to leave intercommunicating passages between the body particles. Such tiles may be made of a variety of materials, including both fibrous and granular materials and also mixtures of these. Such tiles may be made of asbestos, mineral wool, slag wool, glass wool, crushed mineral particles, cork granules, pumice, blown slag, rock sponge, exfoliated vermiculite and artificially produced materials of various shapes and sizes, etc. These are bonded together by a suitable binder or cement, plaster of Paris and sodium silicate being used extensively. A minimum of binder is used, usually only enough being used to bind the particles together at their points of contact, to thereby produce a tile of maximum porosity and of at least a fair sound-absorption efficiency. When rock sponge or similar floatable porous slag or rock and a viscous binder are used, the wet tile may be subjected to pressure and the intercommunicating passages between the body particles substantially completely eliminated. In another modification employing similar material, a range of sizes of particles is used so that the intercommunicating passages between the larger particles are substantially completely filled with smaller particles.

The bonding agents which have been used, usually dry to a brittle hardness. The resulting tile is brittle, especially if only the points of contact are cemented together, and must be handled carefully before and during erection in order to avoid high breakage losses. Such tile also must be packed carefully for shipment.

I have found that if a small amount of rubber is distributed or dispersed uniformly throughout the binding agent, the resulting acoustic tile becomes more resilient and withstands rougher handling during manufacture, shipment and erection. Alkali silicates are used extensively as binders. Although rubber in the form of a solution, or in suspension as latex, may be dispersed throughout an alkali silicate solution by mechanical means, the rubber so dispersed tends to coalesce and rise to the top of the silicate solution before the silicate dries and hardens. When such a solution is used as a binder for tiles, the tile becomes brittle and does not possess the good effects obtained when the rubber is maintained in uniformly dispersed condition in the silicate. I have discovered a method whereby the rubber may be kept uniformly dispersed in the alkali silicate solutions, especially the more viscous solutions, without appreciably decreasing the adhesive properties of the silicate. Furthermore, my method increases the water resistance of the silicate. This method is the subject of my copending application, Serial No. 652,695 filed Jan. 20, 1933.

If a rubber solution or suspension, such as latex, is properly dispersed in a sodium silicate solution of high viscosity, it is possible to keep the rubber dispersed for a considerable period of time, usually sufficient to allow the alkali silicate to be manipulated and used in the usual manner and for the usual purposes. I have found that the desired result can be obtained by adding a salt, or other chemical which gels the alkali silicate slowly, to the solution, and then adding the rubber solution to it by means of a high speed beater or mixer. The reaction is slow enough so that the alkali silicate may be manipulated and used to form the tiles of this invention before it sets and becomes hard.

Sodium silicofluoride or potassium silicofluoride, both of which are sparingly soluble in water, when added in powdered form to an alkali silicate solution and thoroughly mixed therewith, give good results. The rubber, if dispersed by mechanical or other means in the silicate, to which the silicofluoride is thus added, remains dispersed and does not coalesce or rise to the top thereof. The silicofluorides probably act to decrease the alkalinity of the silicate rather than to form silicic acid or an insoluble silicate. Apparently any other material which lowers the alkalinity of the alkali silicate solution and which may be thoroughly mixed with it and used before appreciable reaction occurs, accomplishes the same result. Benzoic and citric acids (in powdered dry form) in small amounts, may be used. Borax also may be used. The alkali silicofluorides, and especially the sodium salt, are preferred because they seem to give the best results. The globules of finely dispersed rubber solution or latex apparently are kept in suspension by a coagulated or thickened envelope of silicate or silica gel about each particle of silicofluoride or other reactive material. These salts also produce the desirable effect of increasing the water resistance of the alkali silicate. The low water solubility of the silicofluorides apparently is a desirable property.

The alkali silicate preferably is one which is of medium alkalinity—an SiO₂ to Na₂O ratio of 3.25 to 1 gives excellent results. Other ratios may be used although those with a higher SiO₂ ratio gel more rapidly when the gelling agent is mixed with them. The alkali silicate solution preferably is a concentrated one, that is, the solution is of a molasses consistency or of still higher viscosity. For example, a 3.25 to 1 SiO₂ to Na₂O ratio silicate preferably should have a specific gravity of 40° Bé. or over.

The effect of the dispersing agent is clearly shown when the alkali silicate solution is examined under a microscope. Without the dispersing agent present the rubber particles coalesce rapidly and form relatively large bodies. With the dispersing agent present the particles remain dispersed.

Although the amounts of rubber solution or latex and dispersing agent may be varied over wide limits, it is desirable to keep the amounts of these used as low as possible because of their relatively high cost. For most adhesive purposes the amount of rubber latex, based on 60% rubber content in an ammoniacal solution need not exceed 20% of the alkali silicate solution and preferably it should be less than 10%. As little as 1% of rubber latex may be used with good effect. Usually it is not feasible to use more than 10% of sodium silicofluoride because of the detrimental effect on the adhesive strength of the silicate. This amount however, depends in part on the type of silicate used, and the permissible amount increases with increasing Na₂O content. I prefer to use alkali silicofluoride in an amount less than 5% of the weight of the alkali silicate solution. Sodium silicofluoride in an amount equal to about 50% of the weight of 60% latex solution used is a convenient ratio which may be used. A sodium silicate solution containing 5% of latex and 2½% of sodium silicofluoride has given excellent results as an adhesive in making the tiles of this invention. As little as 1% and as high as 5% of silicofluoride may be used with good results. The resulting product, especially if dried at 100° to 150° C. is resistant to the action of water. The water resistance increases with increase of dispersing agent. The finely dispersed rubber gives the product a resilience which is desirable for many purposes.

In a specific example an acoustic tile was made of a mixture consisting of 150 parts by weight of porous slag particles which passed through a 4 mesh screen and were retained on a 28 mesh screen, and an adhesive consisting of an intimate mixture of 145 parts by weight of a 3.25 to 1 ratio sodium silicate solution of 42° Bé., 4 parts of a 60% rubber latex solution, and 3 parts of powdered sodium silicofluoride. After the above mixture is formed into shape it is dried. The result is a somewhat resilient structure with pores and intercommunicating passages. Pumice or other aggregates may be substituted for the slag and an equivalent rubber solution, such as rubber cement, may be substituted for the rubber latex.

In another example exfoliated vermiculite is used. 125 parts of exfoliated vermiculite screened to pass through a 4 mesh screen and to stay on an 8 mesh screen are mixed with an adhesive consisting of 125 parts of the sodium silicate of the previous example, 5 parts of 60% rubber latex and 5 parts of powdered sodium silicofluoride. The mixture is shaped and dried in the usual way.

It is obvious that various body particles may be used and that the proportions of the constituents may be changed to vary the physical properties of the acoustic tile.

A solution of rubber in benzol, carbon disulphide, aniline or other suitable solvent may be substituted for the rubber latex. However, such solutions do not seem to work as smoothly as the colloidal rubber latex suspension and therefore latex is the preferred material.

Throughout the claims wherever rubber or latex is specified quantitatively, it refers to a 60% solution or an amount of latex of different concentration containing an equivalent amount of rubber.

Whenever a gel is referred to, it refers to any of the jelly-like products which may result from the gelling of an alkali silicate solution by the slow-acting chemicals mentioned herein, and formed by any or all of the methods described herein.

I claim:

1. An acoustic tile consisting of body particles bonded together with an adhesive comprising a alkali silicate containing rubber substantially uniformly dispersed throughout to form intercommunicating channels and pores between said body particles, said adhesive comprising the product resulting from the drying of a concentrated alkali silicate solution containing not more than 12 percent of rubber and a silica gel uniformly dispersed throughout.

2. The acoustic tile of claim 1 in which the particles are of mineral wool.

3. An acoustic tile consisting of body particles bonded together with an adhesive comprising an alkali silicate containing rubber substantially uniformly dispersed throughout to form intercommunicating channels and pores between said body particles, said adhesive comprising the product resulting from the drying of an alkali silicate solution containing a relatively small amount of rubber latex and a silica gel uniformly dispersed throughout, said silica gel having been formed in situ by the reaction of an alkali silicofluoride on said alkali silicate solution.

4. The acoustic tile of claim 3 in which the alkali silicate is sodium silicate and the alkali silicofluoride is sodium silicofluoride.

5. The acoustic tile of claim 3 in which the alkali silicate is sodium silicate, the alkali silicofluoride is sodium silicofluoride, and the body particles are a porous fire-resisting aggregate.

6. The acoustic tile of claim 1 in which less than 10% of rubber is dispersed in the dried alkali silicate adhesive.

7. The acoustic tile of claim 3 in which the alkali silicate is sodium silicate, the alkali silicofluoride is sodium silicofluoride and in which 2% to 5% of rubber latex and less than 10% of solid sodium silicofluoride is dispersed in the alkali silicate solution used as the wet adhesive.

8. The method for making a resilient acoustic tile which comprises preparing an adhesive comprising a concentrated alkali silicate solution containing not more than 12 percent of rubber fixedly dispersed therein by means of a silica gel formed in situ, mixing said adhesive with body particles in such proportion that the dried finished tile will have intercommunicating pores and channels, forming a tile of said mixture, and drying said tile.

9. The method of claim 8 in which alkali silicofluoride is the substance which is added to the alkali silicate solution to gel it.

10. The method of claim 8 in which sodium silicofluoride is the substance which is added and sodium silicate is the alkali silicate, and in which 2 to 5 percent of rubber latex and less than 10 percent of sodium silicofluoride is used, said percentages being based on the weight of the sodium silicate solution used.

11. An acoustic tile consisting of body particles bonded together with an adhesive comprising an alkali silicate containing rubber uniformly dispersed throughout to form intercommunicating channels and pores between said body particles, said adhesive comprising the product resulting from the drying of a concentrated alkali silicate solution containing not more than 12 percent of rubber and a silica gel uniformly dispersed therethrough, said silica gel being formed in situ by the reaction of not more than 10 percent of an alkali silicofluoride on said alkali silicate solution.

12. The method for making a resilient acoustic tile which comprises preparing an adhesive comprising a concentrated alkali silicate solution containing not more than 12 percent of rubber fixedly dispersed therein by means of a silica gel formed in situ, mixing said adhesive with body particles in such proportion that the dried finished tile will have intercommunicating pores and channels, forming a tile of said mixture and drying said tile.

13. An acoustic tile consisting of body particles bonded together with an adhesive comprising an alkali silicate containing rubber uniformly dispersed throughout to form intercommunicating channels and pores between said body particles, said adhesive comprising the product resulting from the drying of a concentrated alkali silicate solution containing from 0.6 to 6 percent of rubber and a silica gel uniformly dispersed therethrough, said silica gel being formed in situ by the reaction of from 1 to 5 percent of an alkali silicofluoride on said alkali silicate solution.

14. The method for making a resilient acoustic tile which comprises preparing an adhesive comprising a concentrated alkali silicate solution containing not more than 6 percent of rubber fixedly dispersed therein by means of a silica gel formed in situ, mixing said adhesive with body particles in such proportion that the dried finished tile will have intercommunicating pores and channels, forming a tile of said mixture and drying said tile.

MAX H. KLIEFOTH.

CERTIFICATE OF CORRECTION.

Patent No. 1,976,946.　　　　　　　　　　　　　　　　October 16, 1934.

MAX H. KLIEFOTH.

It is hereby certified that error appears in the printed specification of the above numbered patent requiring correction as follows: Page 2, line 103, claim 1, for "a" read an; line 119, claim 3, for "an" read a concentrated; and lines 120 and 121, of said claim 3, for the words "a relatively small amount of rubber latex" read not more than 12 percent of rubber; and that the said Letters Patent should be read with these corrections therein that the same may conform to the record of the case in the Patent Office.

Signed and sealed this 13th day of November, A. D. 1934.

Leslie Frazer (Seal)　　　　　　　　　　　　　　　　　　　Acting Commissioner of Patents.